US010212634B2

(12) United States Patent
Wu et al.

(10) Patent No.: US 10,212,634 B2
(45) Date of Patent: Feb. 19, 2019

(54) COMMUNICATION METHOD, DEVICE, AND SYSTEM

(71) Applicant: HUAWEI TECHNOLOGIES CO., LTD., Shenzhen (CN)

(72) Inventors: Xiaobo Wu, Shanghai (CN); Guangwei Wang, Shanghai (CN); Guobao Xi, Shanghai (CN); Chao Sun, Shanghai (CN); Xinyong Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 15 days.

(21) Appl. No.: 15/099,086

(22) Filed: Apr. 14, 2016

(65) Prior Publication Data
US 2016/0234744 A1 Aug. 11, 2016

Related U.S. Application Data

(63) Continuation of application No. PCT/CN2013/085924, filed on Oct. 25, 2013.

(51) Int. Cl.
H04W 36/22 (2009.01)
H04W 76/18 (2018.01)
(Continued)

(52) U.S. Cl.
CPC ......... H04W 36/22 (2013.01); H04L 65/1069 (2013.01); H04W 36/0022 (2013.01);
(Continued)

(58) Field of Classification Search
None
See application file for complete search history.

(56) References Cited

U.S. PATENT DOCUMENTS

2011/0002327 A1 1/2011 Dwyer et al.
2012/0014381 A1 1/2012 Dwyer et al.
(Continued)

FOREIGN PATENT DOCUMENTS

CN 101795442 A 8/2010
CN 102781003 A 11/2012
(Continued)

OTHER PUBLICATIONS

3rd Generation Partnership Project, 3GPP TS 23.401 V12.2.0 (Sep. 2013), "Technical Specification Group Services and System Aspects; General Packet Radio Service (GPRS) enhancements for Evolved Universal Terrestrial Radio Access Network (E-UTRAN) access (Release 12)".*
(Continued)

Primary Examiner — Brandon M Renner
Assistant Examiner — Manuel Rangel
(74) Attorney, Agent, or Firm — Staas & Halsey LLP

(57) ABSTRACT

A communication method includes: sending, by an MME, a bearer setup request message to an eNodeB, where the bearer setup request message is used to instruct the eNodeB to set up a voice bearer for user equipment; and when the MME receives a bearer setup failure message sent by the eNodeB in response to the bearer setup request message, sending, by the MME, an indication message to the user equipment, where the indication message is used to indicate that a voice over VoIMS of the user equipment is unavailable. When setup of a voice bearer of a VoLTE call fails, the user equipment is notified that a VoLTE is unavailable, so that the user equipment can be prevented from continuing attempting to initiate the VoLTE call and exacerbating cell congestion.

10 Claims, 4 Drawing Sheets

(51) Int. Cl.
  *H04W 36/00* (2009.01)
  *H04W 36/32* (2009.01)
  *H04W 60/04* (2009.01)
  *H04L 29/06* (2006.01)
  *H04L 29/08* (2006.01)
(52) U.S. Cl.
  CPC ........... *H04W 36/32* (2013.01); *H04W 60/04* (2013.01); *H04W 76/18* (2018.02); *H04L 65/1016* (2013.01); *H04L 67/26* (2013.01)

(56) References Cited

U.S. PATENT DOCUMENTS

| | | | | |
|---|---|---|---|---|
| 2012/0165013 | A1* | 6/2012 | Nishida | H04W 76/38 455/435.1 |
| 2012/0207129 | A1* | 8/2012 | Sun | H04W 76/00 370/331 |
| 2012/0327852 | A1 | 12/2012 | Zisimopoulos et al. | |
| 2013/0039301 | A1 | 2/2013 | Nishida et al. | |
| 2013/0148597 | A1* | 6/2013 | Lee | H04W 72/1236 370/329 |
| 2014/0064156 | A1* | 3/2014 | Paladugu | H04W 36/0022 370/259 |
| 2015/0023276 | A1 | 1/2015 | Takeda et al. | |
| 2015/0350880 | A1* | 12/2015 | Li | H04W 8/20 370/331 |
| 2015/0358477 | A1* | 12/2015 | Jeong | H04M 15/56 370/259 |
| 2016/0174285 | A1* | 6/2016 | Ke | H04W 8/06 370/329 |
| 2016/0183156 | A1* | 6/2016 | Chin | H04W 36/0022 370/331 |

FOREIGN PATENT DOCUMENTS

| | | |
|---|---|---|
| CN | 102783217 A | 11/2012 |
| CN | 103167564 A | 6/2013 |
| EP | 2434809 A1 | 3/2012 |
| EP | 2819441 | 12/2014 |
| JP | 2011-166455 | 8/2011 |
| JP | 2012-529247 | 11/2012 |
| JP | 2013-517732 | 5/2013 |
| JP | 2013-219528 | 10/2013 |
| JP | 2014-528671 | 10/2014 |
| WO | 2009/088496 A1 | 7/2009 |
| WO | 2013/052030 A2 | 4/2013 |
| WO | 2013/104750 A2 | 7/2013 |
| WO | WO2013125896 | 8/2013 |

OTHER PUBLICATIONS

"3rd Generation Partnership Project; Technical Specification Group Services and System Aspects; Single Radio Voice Call Continuity (SRVCC); Stage 2 (Release 11)", 3GPP TS 23.216 V11.9.0, 3GPP Organizational Partners, Jun. 2013, Valbonne, France, p. 1-68.

"3rd Generation Partnership Project; Technical Specification Group Services and System Aspects; Circuit Switched (CS) fallback in Evolved Packet System (EPS); Stage 2 (Release 11)", 3GPP TS 23.272 V11.6.03GPP Organizational Partners, Sep. 2013, Valbonne, France, p. 1-97.

"3rd Generation Partnership Project; Technical Specification Group Core Network and Terminals; Mobile radio interface Layer 3 specification; Core network protocols; Stage 3 (Release 11)", 3GPP TS 24.008 V11.8.0 03GPP Organizational Partners, Sep. 2013, Valbonne, France, p. 1-677.

"3rd Generation Partnership Project; Technical Specification Group Radio Access Network; Evolved Universal Terrestrial Radio Access Network (E-UTRAN); Self-configuring and self-optimizing network (SON) use cases and solutions (Release 9)", 3GPP TR 36.902 V9.3.1 3GPP Organizational Partners, Mar. 2011, Valbonne, France, p. 1-21.

International Search Report dated Jul. 9, 2014 in corresponding International Patent Application No. PCT/CN2013/085924.

Extended European Search Report dated Sep. 23, 2016 in corresponding European Patent Application No. 13895941.6.

International Search Report dated Jul. 9, 2014 in corresponding International Application No. PCT/CN2013/085924.

Japanese Office Action dated Apr. 25, 2017 in corresponding Japanese Patent Application No. 2016-521927.

*3rd Generation Partnership Project; Technical Specification Group Core Network and Terminals; Non-Access-Stratum (NAS) protocol for Evolved Packet System (EPS); Stage 3 (Release 8)*, 3GPP TS 24.301 V8.1.0 (Mar. 2009), pp. 1-252.

Ericsson, ST-Ericsson, *Use of QCI values in MME for vSRVCC*, 3GPP TSG SA WG2 Meeting #79, May 10-14, 2010, Kyoto, Japan, TD S2-102454, pp. 1-4.

*3rd Generation Partnership Project; Technical Specification Group Services and System Aspects; Policy and charging control architecture (Release 12)*, 3GPP TS 23.203 V12.2.0 (Sep. 2013), pp. 1-204.

Communication Pursuant to Article 94(3) EPC, dated Mar. 7, 2018, in European Application No. 13895941.6 (9 pp.).

Notice of Allowance, dated Oct. 17, 2018, in Chinese Application No. 201380004655.X (4 pp.).

* cited by examiner

COMMUNICATION METHOD, DEVICE, AND SYSTEM

CROSS-REFERENCE TO RELATED APPLICATIONS

This application is a continuation of International Patent Application No. PCT/CN2013/085924 filed on Oct. 25, 2013, which is hereby incorporated by reference in the entirety.

TECHNICAL FIELD

Embodiments of the present invention relate to the field of communications technologies, and in particular, to a communication method, device, and system.

BACKGROUND

With development of a Long Term Evolution (LTE) technology, an overall industry chain of a voice over LTE (VoLTE) from circuit switched fallback (CSFB) to single radio voice call continuity (SRVCC) has been mature, and the VoLTE is widely used.

Compared with a data service of the LTE, a data service of the VoLTE has a higher requirement for LTE radio coverage, and reasons for which mainly include the following aspects:

(1) The VoLTE has a higher requirement for quality of service (QoS) and has a high requirement for real time; therefore, resource scheduling of the LTE needs to preferentially ensure an access rate of the VoLTE;

(2) The VoLTE supports a high-definition voice and video codec, and has a high requirement for bandwidth. Therefore, the resource scheduling of the LTE needs to preferentially ensure bandwidth occupation of the VoLTE.

In a process of studying and practicing the prior art, the inventor of the present invention finds that: because the LTE needs to first ensure a VoLTE requirement is met, when traffic of the VoLTE is extremely heavy, cell congestion occurs, thereby causing a VoLTE-based call failure. In this case, user equipment still continues attempting to initiate the VoLTE call, which exacerbates the cell congestion.

SUMMARY

Embodiments of the present invention provide a communication method, in which user equipment may be notified, when a VoLTE call fails, that a VoIMS is unavailable, so that the user equipment can be prevented from continuing attempting to initiate the VoLTE call and exacerbating cell congestion. The embodiments of the present invention further provide a corresponding device and system.

A first aspect of the embodiments of the present invention provides a communication method, including:

sending, by a mobility management entity MME, a bearer setup request message to an evolved NodeB eNodeB, where the bearer setup request message is used to instruct the eNodeB to set up a voice bearer for user equipment; and when the MME receives a bearer setup failure message sent by the eNodeB in response to the bearer setup request message, sending, by the MME, an indication message to the user equipment, where the indication message is used to indicate that a voice over Internet Protocol IP multimedia subsystem IMS VoIMS of the user equipment is unavailable.

With reference to the first aspect, in a first possible implementation manner, before the sending, by the MME, an indication message to the user equipment, the method further includes:

sending, by the MME, a notification message to the user equipment, where the notification message is used to trigger the user equipment to initiate registration or combined registration; and receiving, by the MME, a first registration request message or a first combined registration request message that is sent by the user equipment; and the sending, by the MME, an indication message to the user equipment, where the indication message is used to indicate that a VoIMS of the user equipment is unavailable includes:

sending, by the MME, a first registration acceptance message or a first combined registration acceptance message to the user equipment, where the first registration acceptance message or the first combined registration acceptance message includes first indication information, and the first indication information is used to indicate that the VoIMS of the user equipment is unavailable.

With reference to the first possible implementation manner of the first aspect, in a second possible implementation manner, the notification message is a detach request message; or the notification message is a globally unique temporary identity GUTI reallocation message, where the GUTI reallocation message includes an invalid tracking area identity list TAI list.

With reference to the second possible implementation manner of the first aspect, in a third possible implementation manner, the detach request message includes international mobile subscriber identity IMSI detach indication information.

With reference to any one of the first to the third possible implementation manners of the first aspect, in a fourth possible implementation manner, the first registration request message is an attach message, and the first registration acceptance message is an attach acceptance message; or the first combined registration request message is a combined attach message, and the first combined registration acceptance message is a combined attach acceptance message;

or, the first registration request message is a tracking area update message, and the first registration acceptance message is a tracking area update acceptance message;

or, the first combined registration request message is a combined tracking area update message, and the first combined registration acceptance message is a combined tracking area update acceptance message.

With reference to the first aspect and any one of the first to the fourth possible implementation manners of the first aspect, in a fifth possible implementation manner, the method further includes:

sending, by the MME, a first location update request message to a home subscriber server HSS according to the bearer setup failure message, where the first location update request message is used to notify the HSS that the VoIMS of the user equipment is unavailable.

With reference to the first aspect and any one of the first to the fourth possible implementation manners of the first aspect, in a sixth possible implementation manner, after the sending, by the MME, an indication message to the user equipment, the method further includes:

receiving, by the MME, a second registration request message or a second combined registration request message that is sent by the user equipment; and sending, by the MME, a second registration acceptance message or a second combined registration acceptance message to the user equipment, where the second registration acceptance message or the second combined registration acceptance message includes second indication information, and the second indication information is used to indicate that the VoIMS of the user equipment is available.

With reference to the sixth possible implementation manner of the first aspect, in a seventh possible implementation manner, after the sending, by the MME, a second registration acceptance message or a second combined registration acceptance message to the user equipment, the method further includes:

sending, by the MME, a second location update request message to a home subscriber server HSS, where the second location update request message is used to notify the HSS that the voice over Internet Protocol IP multimedia subsystem IMS VoIMS of the user equipment is available.

With reference to the fifth possible implementation manner of the first aspect, in an eighth possible implementation manner, after the sending, by the MME, an indication message to the user equipment, the method further includes:

receiving, by the MME, a second registration request message or a second combined registration request message that is sent by the user equipment; and sending, by the MME, a second registration acceptance message or a second combined registration acceptance message to the user equipment, where the second registration acceptance message or the second combined registration acceptance message includes second indication information, and the second indication information is used to indicate that the VoIMS of the user equipment is available.

With reference to the eighth possible implementation manner of the first aspect, in a ninth possible implementation manner, after the sending, by the MME, a second registration acceptance message or a second combined registration acceptance message to the user equipment, the method further includes:

sending, by the MME, a second location update request message to the HSS, where the second location update request message is used to notify the HSS that the VoIMS of the user equipment is available.

With reference to the first aspect and any one of the first to the ninth possible implementation manners of the first aspect, in a tenth possible implementation manner, that the bearer setup request message is used to instruct the eNodeB to set up a voice bearer for user equipment includes:

the bearer setup request message is used to instruct the eNodeB to set up a bearer whose quality of service class identifier QCI is equal to 1 for the user equipment.

A second aspect of the present invention provides a mobility management entity, including:

a sending unit, configured to send a bearer setup request message to an evolved NodeB eNodeB, where the bearer setup request message is used to instruct the eNodeB to set up a voice bearer for user equipment; and a receiving unit, configured to receive a bearer setup failure message sent by the eNodeB in response to the bearer setup request message; where the sending unit is further configured to send an indication message to the user equipment, where the indication message is used to indicate that a voice over Internet Protocol IP multimedia subsystem IMS VoIMS of the user equipment is unavailable.

With reference to the second aspect, in a first possible implementation manner, the sending unit is further configured to send a notification message to the user equipment before the mobility management entity sends the indication message to the user equipment, where the notification message is used to trigger the user equipment to initiate registration or combined registration;

the receiving unit is further configured to receive a first registration request message or a first combined registration request message that is sent by the user equipment; and the sending unit is configured to send a first registration acceptance message or a first combined registration acceptance message to the user equipment, where the first registration acceptance message or the first combined registration acceptance message includes first indication information, and the first indication information is used to indicate that the VoIMS of the user equipment is unavailable.

With reference to the second aspect or the first possible implementation manner of the second aspect, in a second possible implementation manner, the sending unit is further configured to send a first location update request message to a home subscriber server HSS according to the bearer setup failure message, where the first location update request message is used to notify the HSS that the VoIMS of the user equipment is unavailable.

With reference to the second aspect or the first possible implementation manner of the second aspect, in a third possible implementation manner, the receiving unit is further configured to receive a second registration request message or a second combined registration request message that is sent by the user equipment; and the sending unit is further configured to send a second registration acceptance message or a second combined registration acceptance message to the user equipment, where the second registration acceptance message or the second combined registration acceptance message includes second indication information, and the second indication information is used to indicate that the VoIMS of the user equipment is available.

With reference to the third possible implementation manner of the second aspect, in a fourth possible implementation manner, the sending unit is further configured to send a second location update request message to a home subscriber server HSS, where the second location update request message is used to notify the HSS that the voice over Internet Protocol IP multimedia subsystem IMS VoIMS of the user equipment is available.

With reference to the second possible implementation manner of the second aspect, in a fifth possible implementation manner, the receiving unit is further configured to receive a second registration request message or a second combined registration request message that is sent by the user equipment; and the sending unit is further configured to send a second registration acceptance message or a second combined registration acceptance message to the user equipment, where the second registration acceptance message or the second combined registration acceptance message includes second indication information, and the second indication information is used to indicate that the VoIMS of the user equipment is available.

With reference to the fifth possible implementation manner of the second aspect, in a sixth possible implementation manner, the sending unit is further configured to send a second location update request message to the HSS, where the second location update request message is used to notify the HSS that the VoIMS of the user equipment is available.

Compared with the prior art, according to the solutions provided in the embodiments of the present invention, when setup of a voice bearer of a VoLTE call fails, user equipment is notified that a VoLTE is unavailable, so that the user equipment can be prevented from continuing attempting to initiate the VoLTE call and exacerbating cell congestion.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person skilled in the art may still derive other drawings from these accompanying drawings without creative efforts.

DESCRIPTION OF EMBODIMENTS

Embodiments of the present invention provide a communication method, in which user equipment may be notified, when a VoLTE call fails, that a VoIMS is unavailable, so that the user equipment can be prevented from continuing attempting to initiate the VoLTE call and exacerbating cell congestion. The embodiments of the present invention further provide a corresponding device and system. Details are separately illustrated in the following.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

Acronyms and abbreviations of some communications terms involved in the embodiments of the present invention include: mobility management entity (MME), evolved NodeB (eNodeB), user equipment (UE), mobile switching center (MSC), 2nd generation or 3rd generation mobile communications technology (2G or 3G), Long Term Evolution (LTE), IP multimedia system (MS), circuit switching (CS), home subscriber server (HSS), mobile station identifier (International Mobile Station Identifier, IMSI), call session control function (CSCF), proxy-CSCF (P-CSCF), interrogating-CSCF (I-CSCF), serving-CSCF (S-CSCF), serving gateway (S-GW), evolved packet core (EPC), quality of service (QoS), QoS class identifier (QCI), voice over LTE (VoLTE), voice over IMS (VoIMS), and service centralization and continuity application server (SCCAS).

Figure 1:
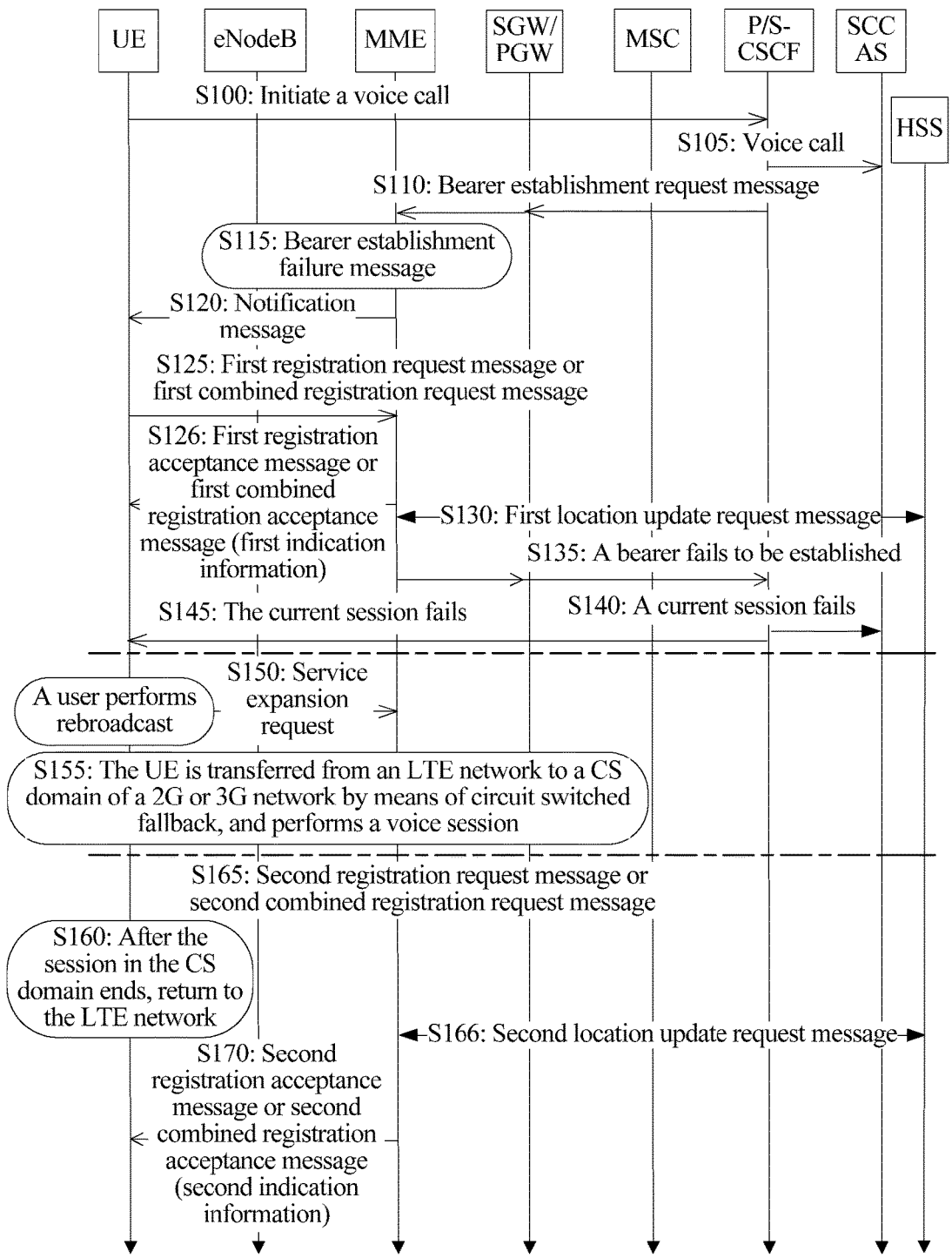
FIG. 1 is a schematic diagram of a communication method according to an embodiment of the present invention.

Referring to FIG. 1, FIG. 1 is a UE calling process in a communication method in an embodiment of the present invention:

S100: A UE initiates a VoLTE voice call in an LTE network.

S105: The UE sends a voice call request to a P/S-CSCF, and the P/S-CSCF initiates a voice call to an SCCAS.

S110: After the P-CSCF receives the voice call request sent by the UE, the P-CSCF sends a bearer setup request message to an SGW/PGW/MME by using a policy and charging control (PCC) system.

The bearer setup request message may be a message requesting to set up a voice bearer whose QCI=1.

S115: The MME sends the bearer setup request message to an evolved eNodeB, and when the eNB has no air interface resource, the eNodeB sends a bearer setup failure message to the MME in response to the bearer setup request message sent by the MME.

Specifically, if the eNB has no air interface resource, the eNB sends the bearer setup failure message. If the eNB has an air interface resource, the eNB sends a bearer setup success message.

The bearer setup request message sent by the MME is used to instruct the eNodeB to set up a bearer whose quality of service class identifier QCI is equal to 1 for the user equipment.

The bearer setup failure message is used to indicate that setup of the voice bearer whose QCI=1 fails.

S120: The MME sends a notification message to the UE, where the notification message is used to trigger the UE to initiate registration or combined registration.

The notification message is a detach request message; or the notification message is a globally unique temporary identity GUTI reallocation message, where the GUTI reallocation message includes an invalid tracking area identity list TAI list).

The detach request message includes international mobile subscriber identity IMSI detach indication information IMSI Detach.

S125: The UE sends a first registration request message or a first combined registration request message to the MME.

The first registration request message is an attach message; or the first registration request message is a tracking area update TAU message.

The first combined registration request message is a combined attach message; or the first combined registration request message is a combined tracking area update TAU message.

S126: The MME sends a first registration acceptance message or a first combined registration acceptance message to the user equipment, where the first registration acceptance message or the first combined registration acceptance message includes first indication information, and the first indication information is used to indicate that a voice over Internet Protocol IP multimedia subsystem IMS VoIMS of the user equipment is unavailable.

The first registration acceptance message is an attach acceptance message; or the first registration acceptance message is a tracking area update TAU acceptance message.

The first combined registration acceptance message is a combined attach acceptance message; or the first combined registration acceptance message is a combined tracking area update TAU acceptance message.

S130: The MME sends a first location update request message to a home subscriber server HSS.

The first location update request message is used to notify the HSS that the voice over Internet Protocol IP multimedia subsystem IMS VoIMS of the user equipment is unavailable.

S135: The MME sends the P/S-CSCF a QCI=1 bearer setup failure message.

S140: The SCC AS notifies the P/S-CSCF that a current session fails.

S145: The P/S-CSCF notifies the UE that the current session fails.

S150: The UE sends a service expansion request message to the MME to trigger a voice session again.

Because the MME indicates, by using the first registration acceptance message or the first combined registration acceptance message, that the voice over Internet Protocol IP multimedia subsystem IMS VoIMS of the UE is unavailable, the UE sends the service expansion request message to the MME, where the service expansion request message is used to request circuit switched fallback.

S155: The UE is transferred from the LTE network to a CS domain of a 2G or 3G network, and performs a voice session in the CS domain of the 2G or 3G network.

S160: After the session in the CS domain of the 2G or 3G network ends, the UE returns to the LTE network.

S165: The UE sends a second registration request message or a second combined registration request message to the MME.

In specific implementation, a timer may be set in the MME. The timer is started after the MME sends the notification message to the UE, and when the timer reaches a predetermined time, the MME sends a notification message to the UE again to trigger the UE to perform step S165.

Certainly, a specific implementation manner is not limited, and another implementation manner may also be used.

S166: The MME sends a second location update request message to a home subscriber server HSS, where the second location update request message is used to notify the HSS that the voice over Internet Protocol IP multimedia subsystem IMS VoIMS of the UE is available.

S170: The MME sends a second registration acceptance message or a second combined registration acceptance message to the UE.

Second indication information included in the second registration acceptance message or the second combined registration acceptance message is used to indicate that the voice over Internet Protocol IP multimedia subsystem IMS VoIMS of the user equipment is available.

Compared with the prior art, according to the solution provided in this embodiment of the present invention, when setup of a voice bearer of a VoLTE call fails, user equipment is notified that a VoLTE is unavailable, so that the user equipment can be prevented from continuing attempting to initiate the VoLTE call and exacerbating cell congestion.

Figure 2:
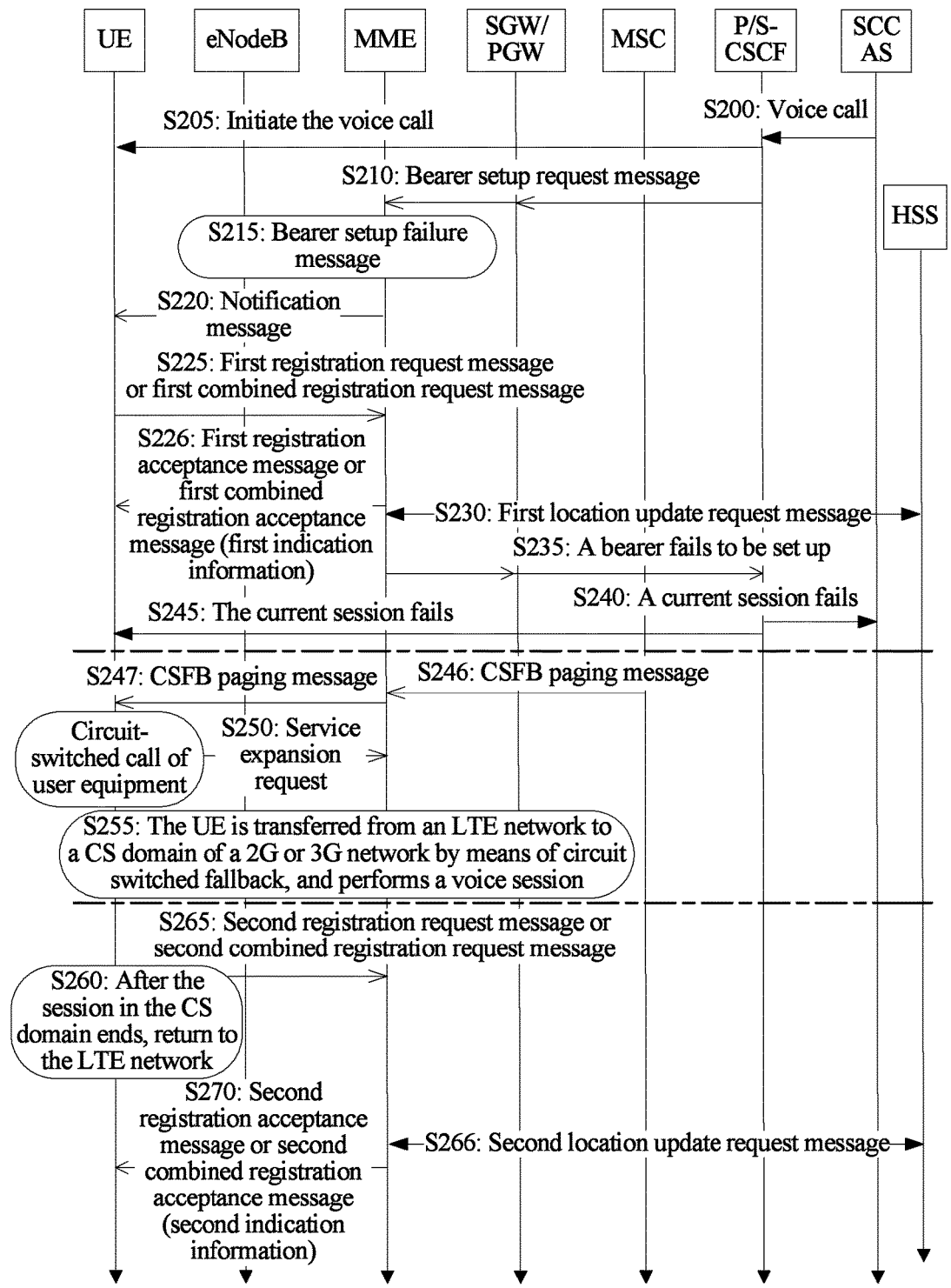
FIG. 2 is a schematic diagram of a communication method according to an embodiment of the present invention.

Referring to FIG. 2, FIG. 2 is a UE called process in a communication method in an embodiment of the present invention:

Steps S200 to S245 in this embodiment of the present invention are the same as steps S100 to S145 in the foregoing calling process, and details are not described herein again.

S246: An MSC initiates, to the MME, a CSFB paging message.

S247: The MME initiates, to the UE, the CSFB paging message.

S250: The UE initiates a CSFB call and sends a service expansion request message to the MME, where the service expansion request message is used to request circuit switched fallback.

S255: The UE is transferred from the LTE network to a CS domain of a 2G or 3G network, and performs a voice session in the CS domain of the 2G or 3G network.

S260: After the session in the CS domain of the 2G or 3G network ends, the UE returns to the LTE network.

S265: The UE sends a second registration request message or a second combined registration request message to the MME.

In specific implementation, a timer may be set in the MME. The timer is started after the MME sends the notification message, and when the timer reaches a predetermined time, the MME sends a notification message to the UE again to trigger the UE to perform step S265.

Certainly, a specific implementation manner is not limited, and another implementation manner may also be used.

S266: The MME sends a second location update request message to a home subscriber server HSS, where the second location update request message is used to notify the HSS that the voice over Internet Protocol IP multimedia subsystem IMS VoIMS of the UE is available.

S270: The MME sends a second registration acceptance message or a second combined registration acceptance message to the user equipment.

Compared with the prior art, according to the solution provided in this embodiment of the present invention, when setup of a voice bearer of a VoLTE call fails, user equipment is notified that a VoLTE is unavailable, so that the user equipment can be prevented from continuing attempting to initiate the VoLTE call and exacerbating cell congestion.

Figure 3:
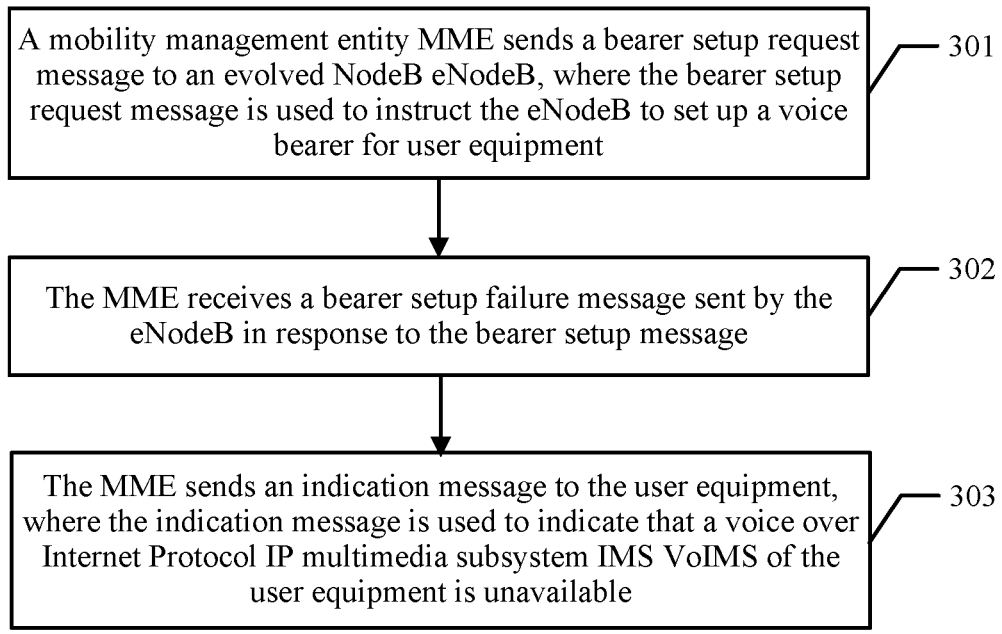
FIG. 3 is a schematic diagram of a communication method according to an embodiment of the present invention.

Referring to FIG. 3, an embodiment of a communication method provided in an embodiment of the present invention includes the following steps:

301. An MME sends a bearer setup request message to an eNodeB, where the bearer setup request message is used to instruct the eNodeB to set up a voice bearer for user equipment.

302. The MME receives a bearer setup failure message sent by the eNodeB in response to the bearer setup request message.

303. The MME sends an indication message to the user equipment, where the indication message is used to indicate that a voice over Internet Protocol IP multimedia subsystem IMS VoIMS of the user equipment is unavailable.

In this embodiment of the present invention, before the MME sends the indication message to the user equipment, the method further includes:

sending, by the MME, a notification message to the user equipment, where the notification message is used to trigger the user equipment to initiate registration or combined registration; and receiving, by the MME, a first registration request message or a first combined registration request message that is sent by the user equipment.

In step 303, that the MME sends an indication message to the user equipment, where the indication message is used to indicate that a VoIMS of the user equipment is unavailable may include:

sending, by the MME, a first registration acceptance message or a first combined registration acceptance message to the user equipment, where the first registration acceptance message or the first combined registration acceptance message includes first indication information, and the first indication information is used to indicate that the VoIMS of the user equipment is unavailable.

For detailed descriptions of the foregoing processing steps performed by the MME and another processing step in this embodiment, reference may be made to the description in the embodiment corresponding to FIG. 1 or FIG. 2, and details are not described herein again.

Figure 4:
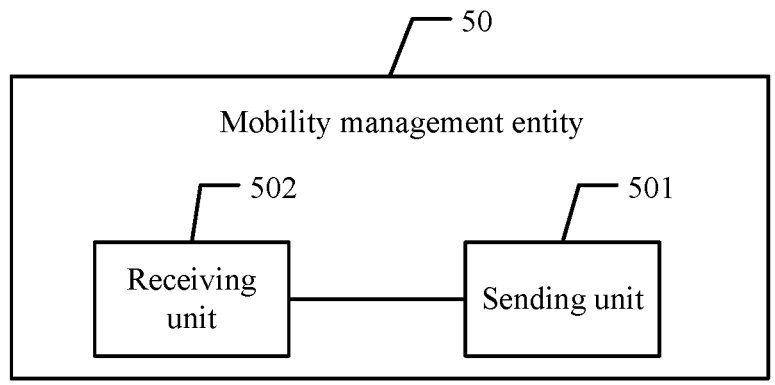
FIG. 4 is a schematic diagram of an embodiment of a mobility management entity according to an embodiment of the present invention.

Referring to FIG. 4, an embodiment of a mobility management entity 50 provided in an embodiment of the present invention includes:

a sending unit 501, configured to send a bearer setup request message to an evolved NodeB eNodeB, where the bearer setup request message is used to instruct the eNodeB to set up a voice bearer for user equipment; and a receiving unit 502, configured to receive a bearer setup failure message sent by the eNodeB in response to the bearer setup request message.

The sending unit 501 is further configured to send an indication message to the user equipment, where the indication message is used to indicate that a voice over Internet Protocol IP multimedia subsystem IMS VoIMS of the user equipment is unavailable.

The sending unit 501 is further configured to send a notification message to the user equipment before the mobility management entity sends the indication message to the user equipment, where the notification message is used to trigger the user equipment to initiate registration or combined registration.

The receiving unit 502 is further configured to receive a first registration request message or a first combined registration request message that is sent by the user equipment.

The sending unit 501 is configured to send a first registration acceptance message or a first combined registration acceptance message to the user equipment, where the first registration acceptance message or the first combined registration acceptance message includes first indication information, and the first indication information is used to indicate that the VoIMS of the user equipment is unavailable.

The sending unit 501 is further configured to send a first location update request message to a home subscriber server HSS according to the bearer setup failure message, where the first location update request message is used to notify the HSS that the VoIMS of the user equipment is unavailable.

The receiving unit 502 is further configured to receive a second registration request message or a second combined registration request message that is sent by the user equipment.

The sending unit 501 is further configured to send a second registration acceptance message or a second combined registration acceptance message to the user equipment, where the second registration acceptance message or the second combined registration acceptance message includes second indication information, and the second indication information is used to indicate that the VoIMS of the user equipment is available.

The sending unit 501 is further configured to send a second location update request message to a home subscriber server HSS, where the second location update request message is used to notify the HSS that the voice over Internet Protocol IP multimedia subsystem IMS VoIMS of the user equipment is available.

The mobility management entity in this embodiment can perform method steps of the MME described in the method embodiments of FIG. 1, FIG. 2, and FIG. 3. A person skilled in the art can understand, according to steps performed in these method embodiments, a behavior of and an action performed by each unit in the MME and a relationship between the units.

A person skilled in the art can understand that in the foregoing embodiment of FIG. 4, the sending unit configured to send a message may be implemented by using a transmitter, and a receiving unit configured to receive a message may be implemented by using a receiver; or the sending unit and the receiving unit both may be implemented by using a transceiver. In physical implementation, a transmitter or a transceiver may be implemented by using one physical entity, or may be implemented by using multiple physical entities. The present invention sets no limitation thereto. Another unit, such as a generating unit, may be implemented by using one or more processors. The present invention sets no limitation thereto. A program executed by a processor in this embodiment of the present invention may be stored in a memory.

Compared with the prior art, when setup of a voice bearer of a VoLTE call fails, the device provided in this embodiment of the present invention notifies user equipment that a VoLTE is unavailable, so that the user equipment can be prevented from continuing attempting to initiate the VoLTE call and exacerbating cell congestion.

Figure 5:
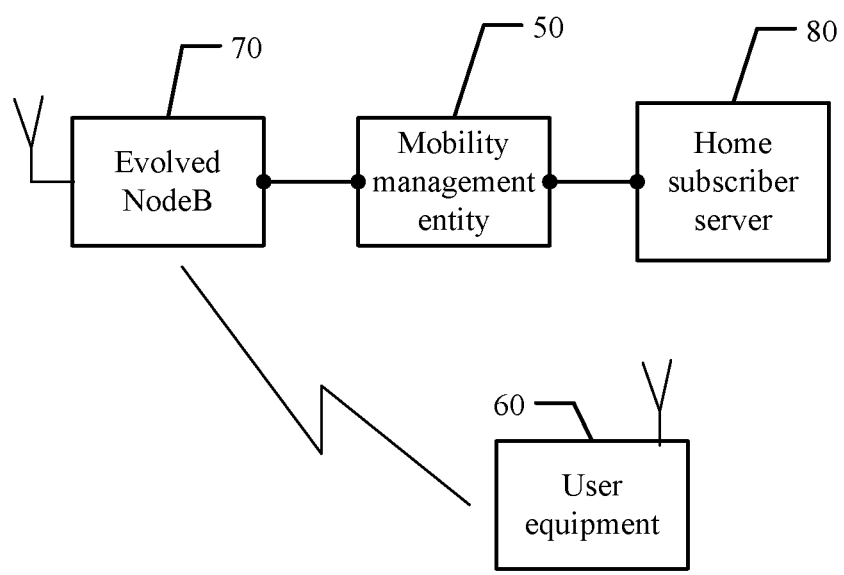
FIG. 5 is a schematic diagram of an embodiment of a communications system according to an embodiment of the present invention.

Referring to FIG. 5, an embodiment of a voice processing system provided in an embodiment of the present invention includes: a mobility management entity 50, user equipment 60, an evolved NodeB 70, and a home subscriber server 80.

For actions respectively performed by the mobility management entity 50, the user equipment 60, the evolved NodeB 70, and the home subscriber server 80 and interaction between the mobility management entity 50, the user equipment 60, the evolved NodeB 70, and the home subscriber server 80, reference may be made to the descriptions in FIG. 1 and FIG. 2, and the descriptions of the method embodiment in FIG. 3 and the apparatus embodiments. Details are not described herein again.

A person of ordinary skill in the art may be aware that, in combined with the examples described in the embodiments disclosed in this specification, units and algorithm steps may be implemented by electronic hardware, computer software, or a combined thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication method, comprising:
sending, by a mobility management entity (MME), a bearer setup request message to an evolved NodeB (eNodeB), the bearer setup request message to instruct the eNodeB to set up a voice bearer for user equipment;
when the MME receives a bearer setup failure message sent by the eNodeB in response to the bearer setup request message, sending, by the MME, an indication message to the user equipment, the indication message to indicate that a voice over Internet Protocol IP multimedia subsystem (VoIMS) of the user equipment is unavailable;
sending, by the MME, a first location update request message to a home subscriber server (HSS) according to the bearer setup failure message, wherein the first location update request message is to notify the HSS that the VoIMS of the user equipment is unavailable;
after the sending, by the MME, the indication message to the user equipment:
receiving, by the MME, a second registration request message or a second combined registration request message that is sent by the user equipment; and
sending, by the MME, a second registration acceptance message or a second combined registration acceptance message to the user equipment, wherein the second registration acceptance message or the second combined registration acceptance message comprises second indication information to indicate that the VoIMS of the user equipment is available,
after the sending, by the MME, the second registration acceptance message or the second combined registration acceptance message to the user equipment,
sending, by the MME, a second location update request message to the HSS, wherein the second location update request message is to notify the HSS that the VoIMS of the user equipment is available.

2. The method according to claim 1, further comprising:
sending, by the MME, a first registration acceptance message or a first combined registration acceptance message to the user equipment, wherein the first registration acceptance message or the first combined registration acceptance message comprises first indication information to indicate that the VoIMS of the user equipment is unavailable.

3. The method according to claim 2, further comprising:
sending, by the MME, a notification message to the user equipment, the notification message to trigger the user equipment to initiate registration or combined registration, wherein:
the notification message is a detach request message; or
the notification message is a globally unique temporary identity (GUTI) reallocation message, wherein the GUTI reallocation message comprises an invalid tracking area identity (TAI) list.

4. The method according to claim 3, wherein:
the detach request message comprises international mobile subscriber identity (IMSI) detach indication information.

5. The method according to claim 2, further comprising:
receiving, by the MME, a first registration request message or a first combined registration request message that is sent by the user equipment in response to a notification message to trigger the user equipment to initiate registration or combined registration, wherein:
the first registration request message is an attach message, and the first registration acceptance message is an attach acceptance message; or
the first combined registration request message is a combined attach message, and the first combined registration acceptance message is a combined attach acceptance message;
or
the first registration request message is a tracking area update message, and the first registration acceptance message is a tracking area update acceptance message;
or
the first combined registration request message is a combined tracking area update message, and the first combined registration acceptance message is a combined tracking area update acceptance message.

6. The method according to claim 1, wherein after the sending, by the MME, the second registration acceptance message or the second combined registration acceptance message to the user equipment, the method further comprises:

sending, by the MME, the second location update request message to the HSS, wherein the second location update request message is to notify the HSS that the voice over Internet Protocol IP multimedia subsystem IMS VoIMS of the user equipment is available.

7. The method according to claim 1, wherein that the bearer setup request message is to instruct the eNodeB to set up the voice bearer for the user equipment comprises:

the bearer setup request message to instruct the eNodeB to set up a bearer whose quality of service class identifier (QCI) is equal to 1 for the user equipment.

8. A mobility management entity comprising:

a memory storing computer-readable instructions; and at least one hardware processor configured to execute the computer-readable instructions to cause:

sending, by the mobility management entity (MME), a bearer setup request message to an evolved NodeB (eNodeB), the bearer setup request message to instruct the eNodeB to set up a voice bearer for user equipment;

when the MME receives a bearer setup failure message sent by the eNodeB in response to the bearer setup request message, sending, by the MME, an indication message to the user equipment, the indication message to indicate that a voice over Internet Protocol IP multimedia subsystem (VoIMS) of the user equipment is unavailable;

sending, by the MME, a first location update request message to a home subscriber server (HSS) according to the bearer setup failure message, wherein the first location update request message is to notify the HSS that the VoIMS of the user equipment is unavailable;

after the sending, by the MME, the indication message to the user equipment:

receiving, by the MME, a second registration request message or a second combined registration request message that is sent by the user equipment; and sending, by the MME, a second registration acceptance message or a second combined registration acceptance message to the user equipment, wherein the second registration acceptance message or the second combined registration acceptance message comprises second indication information to indicate that the VoIMS of the user equipment is available, after the sending, by the MME, the second registration acceptance message or the second combined registration acceptance message to the user equipment, sending, by the MME, a second location update request message to the HSS, wherein the second location update request message is to notify the HSS that the VoIMS of the user equipment is available.

9. The mobility management entity according to claim 8, wherein the at least one hardware processor is further configured to execute:

sending a first registration acceptance message or a first combined registration acceptance message to the user equipment, wherein the first registration acceptance message or the first combined registration acceptance message comprises first indication information to indicate that the VoIMS of the user equipment is unavailable.

10. A mobility management entity comprising:

a transmitter configured to send a bearer setup request message to an evolved NodeB (eNodeB), wherein the bearer setup request message is used to instruct the eNodeB to set up a voice bearer for user equipment; and a receiver configured to receive a bearer setup failure message sent by the eNodeB in response to the bearer setup request message, wherein:

the transmitter is further configured to send an indication message to the user equipment, wherein the indication message is to indicate that a voice over Internet Protocol IP multimedia subsystem (VoIMS) of the user equipment is unavailable, the transmitter is further configured to send a first location update request message to a home subscriber server (HSS) according to the bearer setup failure message, wherein the first location update request message is to notify the HSS that the VoIMS of the user equipment is unavailable, the receiver is further configured to receive a second registration request message or a second combined registration request message that is sent by the user equipment, the transmitter is further configured to send a second registration acceptance message or a second combined registration acceptance message to the user equipment, wherein the second registration acceptance message or the second combined registration acceptance message comprises second indication information to indicate that the VoIMS of the user equipment is available, and the transmitter is further configured to send a second location update request message to the HSS, wherein the second location update request message is to notify the HSS that the VoIMS of the user equipment is available.

* * * * *